US009194617B2

(12) United States Patent
Said et al.

(10) Patent No.: US 9,194,617 B2
(45) Date of Patent: Nov. 24, 2015

(54) INTERMITTENT ABSORPTION REFRIGERATION SYSTEM EQUIPPED WITH A WASTE ENERGY STORAGE UNIT

(71) Applicant: King Fahd University of Petroleum and Minerals, Dhahran (SA)

(72) Inventors: Syed Ahmed Mohammad Said, Dhahran (SA); Muhammad Umar Siddiqui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 172 days.

(21) Appl. No.: 14/133,739

(22) Filed: Dec. 19, 2013

(65) Prior Publication Data
US 2015/0176869 A1 Jun. 25, 2015

(51) Int. Cl.
F25B 15/00 (2006.01)
F25B 17/00 (2006.01)

(52) U.S. Cl.
CPC ..................... *F25B 17/00* (2013.01)

(58) Field of Classification Search
CPC .......... F25B 15/10; F25B 15/06; Y02B 30/62
USPC .................. 62/101, 185, 235.1, 271, 476
See application file for complete search history.

(56) References Cited

U.S. PATENT DOCUMENTS

| 4,222,244 | A * | 9/1980 | Meckler | B01D 53/26 62/235.1 |
| 4,744,224 | A | 5/1988 | Erickson | |
| 2002/0108390 | A1 * | 8/2002 | Ichikawa | F25B 15/02 62/324.2 |
| 2010/0192602 | A1 * | 8/2010 | Brooks | B60H 1/005 62/101 |
| 2011/0167854 | A1 * | 7/2011 | Edwards | F24F 3/1417 62/235.1 |

FOREIGN PATENT DOCUMENTS

| CN | 1945166 A | 4/2007 |
| CN | 101196351 A | 6/2008 |
| WO | WO 2010/063840 A2 | 6/2010 |
| WO | WO 2012/041304 A2 | 4/2012 |

OTHER PUBLICATIONS

J.M. Abdulateef, K. Sopian and M.A. Alghoul, "Optimum Design for Solar Absorption Refrigeration Systems and Comparison of the Performances Using Ammonia-Water, Ammonia-Lithium Nitrate and Ammonia-Sodium Thiocyanate Solutions", p. 17-24, International Journal of Mechanical and Materials Engineering, vol. 3 (2008), No. 1, 17-24.

U. Jakob and U. Eicker, "Simulation and performance of diffusion absorption cooling machines for solar cooling", Aug. 2006, Proceedings of the 9th World Renewable Energy Congress, Florence.

* cited by examiner

*Primary Examiner* — Melvin Jones
(74) *Attorney, Agent, or Firm* — Oblon, McClelland, Maier & Neustadt, L.L.P.

(57) ABSTRACT

A solar powered intermittent absorption refrigeration system utilizes helical coil heat exchangers for generation, absorption, dephlegmation, condensation and heat recovery. The thermo-siphon effect is used to supply and reject heat from the system, to recover and utilize heat from a waste energy unit, to reject heat of absorption, and to pressurize and depressurize the system. The system produces ice blocks during the nighttime without any requirement of electrical energy for the operation of the system.

20 Claims, 7 Drawing Sheets

INTERMITTENT ABSORPTION REFRIGERATION SYSTEM EQUIPPED WITH A WASTE ENERGY STORAGE UNIT

CROSS-REFERENCE TO RELATED APPLICATIONS

This application hereby incorporates by reference U.S. application Ser. No. 14/092,294, filed Nov. 27, 2013.

BACKGROUND

1. Field of the Disclosure

The present disclosure relates to an intermittent absorption refrigeration method and an intermittent absorption refrigeration system.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy consumption due to air-conditioning and refrigeration applications is significant. The coincidence of maximum cooling loads with the period of highest solar irradiance makes solar energy an excellent candidate for powering refrigeration and air conditioning systems, thereby conserving electrical energy. Absorption chillers have the advantage of being operable even with relatively low-quality heat sources such as exhaust gases from industrial processes or solar radiation. In this regard, absorption chillers have the potential to directly use solar energy to produce refrigeration.

Typical absorption cooling systems utilize a heat source to vaporize under pressure a refrigerant out of a strong solution. The pressurized desorbed refrigerant is then condensed by rejecting heat from it to the ambient environment. The condensed refrigerant is then used for evaporative cooling by evaporating it under lower pressure, whereby ambient heat is absorbed from the refrigerated space. The evaporated refrigerant is then absorbed back into the weak solution, resulting in a rich solution, thereby enabling the process to be repeated.

Absorption chillers are basically classified into two categories: continuous operation systems and intermittent operation systems. The basic difference between continuous and intermittent systems is their mode of operation. In continuous systems, both generation and absorption of the refrigerant take place at the same time in a continuous manner. However, in intermittent systems, generation and absorption do not take place at the same time; rather, they intermittently follow each other with the operation of the system.

Historically, the coefficient of performance of intermittent systems has typically been much lower than that of continuous systems. This is largely because a continuous system is able to employ a recuperator-type solution heat exchanger, wherein hot and cold fluids flowing past one another in adjacent channels exchange thermal energy. In this manner, waste heat generated in one portion of the system can be utilized to provide heat required in another portion of the system, thereby increasing the overall coefficient of performance of the system.

In a typical absorption cooling system, the generation process requires thermal energy to vaporize refrigerant out of a liquid absorbent-refrigerant solution, while on the other hand, the absorption process releases thermal energy as refrigerant vapor is absorbed into absorbent-refrigerant solution. In a continuous absorption system, the generation and absorption processes occur simultaneously, thus, both hot and cold solutions are continuously present during the operation of the system. Since both hot and cold solutions are present, a recuperator-type solution heat exchanger allows the system to recover thermal energy released by the absorption process and to use that recovered energy to help drive the generation process.

For intermittent systems, by contrast, it is not possible to use a recuperator-type heat exchanger for waste energy recovery, since hot and cold solutions are not available at the same time. Thus, the coefficient of performance of intermittent systems has been limited.

On the other hand, an advantage of intermittent systems over continuous systems is that they can be designed to provide a cooling effect without any need of electrical energy for the operation of motors, pumps, and the like. However, achieving practically operable designs for motorless refrigeration systems has involved unacceptable trade-offs in terms of size, complexity, and cost.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

In an embodiment, a solar powered intermittent absorbtion refrigeration system includes a solar collector, a generator/absorber unit, a dephlegmator, a condenser, an evaporator, and waste energy storage.

In another embodiment, helical coil heat exchangers are used for generation, absorption, dephlegmation, condensation, and heat recovery.

In another embodiment, thermo-siphon effect is used to supply heat to the generator, to recover heat from the waste energy storage, to reject heat of absorption, and to pressurize and depressurize the generator/absorber unit.

In another embodiment, during the daytime, the system is partially pressurized by recovering heat from the waste energy storage followed by the remaining system's pressurization from the solar energy.

In another embodiment, after pressurization, heat from the solar collector is used to generate aqua-ammonia vapor which is initially rectified within the dephlegmator and is then condensed inside the condenser to be stored within the evaporator unit.

In another embodiment, during the nighttime, the system is partially depressurized by rejecting heat to the waste energy storage which is followed by the remaining depressurization by rejecting heat to the ambient.

In another embodiment, after depressurization, the throttling valve is opened to allow evaporation within the evaporator and to generate the required cooling effect.

In another embodiment, the absorption of ammonia vapors inside the absorber takes place by rejecting heat to the ambient.

In another embodiment, a condenser has a helical coil shape and is disposed concentrically about a waste energy storage unit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
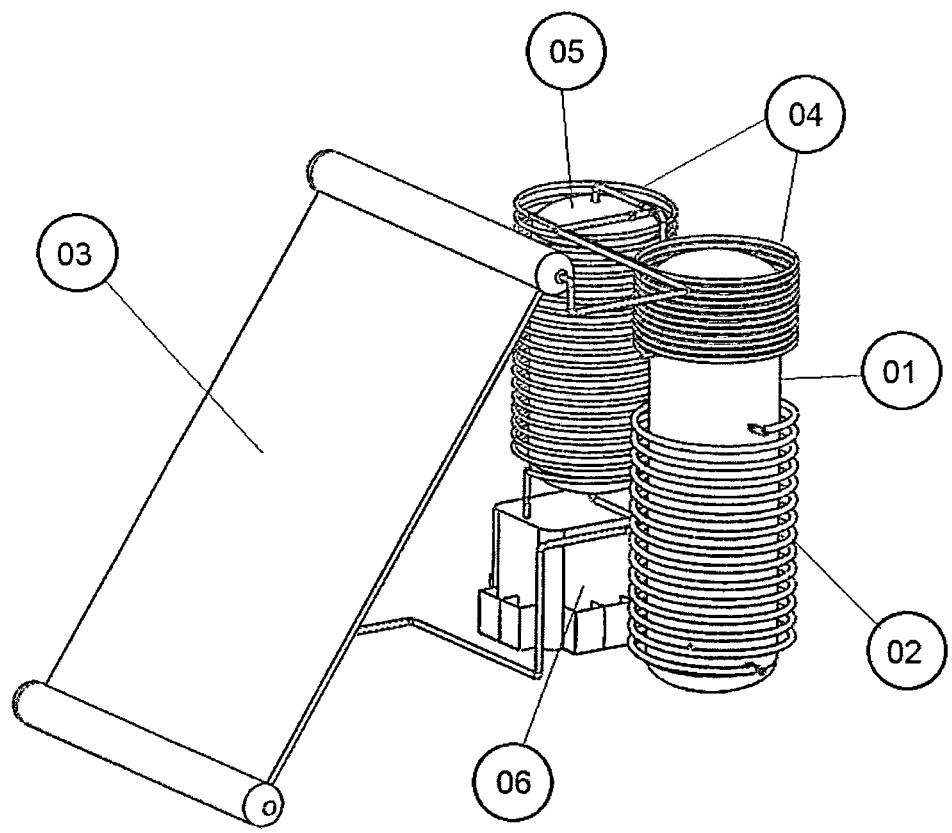
FIG. 1 is a view of a system according to an embodiment, showing the arrangement of the system's units with respect to each other.

Referring now to the drawings, wherein like reference numerals designate identical or corresponding parts throughout the several views, in an embodiment, an energy efficient solar powered intermittent absorption refrigeration system is comprised of six main components, namely, generator/absorber unit 01, absorber coil 02, solar collector field 03, dephlegmation and condensation unit 04, waste energy storage unit 05, and evaporation unit 06 as shown in FIG. 1.

During the daytime, the strong aqua-ammonia solution inside the generator/absorber unit 01 is partially pressurized by gaining heat from the waste energy storage unit 05. After partial pressurization, the remaining pressurization is completed by gaining heat from the solar collector field 03, which comprises a heat exchanger. After complete pressurization, generation of aqua-ammonia vapor takes place by gaining heat from the solar collector field 03. Rectification and condensation of generated aqua-ammonia vapor is conducted by dephlegmation and condensation unit 04. The condensed rectified ammonia is then stored inside the evaporation unit 06 throughout the daytime.

During the nighttime, the generator/absorber unit 01 is partially depressurized by rejecting heat to the waste energy storage unit 05. After partial depressurization, the remaining depressurization is completed by rejecting heat from the absorber coil 02 to the ambient. After complete depressurization, evaporation takes place inside the evaporation unit 06 to produce ice blocks. The evaporation is then followed by the absorption of ammonia due to heat rejection from absorber coil 02 to the ambient. The waste energy storage unit 05 is thus utilized for storing the waste heat from the generator/absorber unit 01 during the depressurization process. This stored waste energy is then returned to the generator/absorber unit 01 during the pressurization process. Hence, the amount of total solar energy input required by the generator/absorber unit 01 is reduced by heat recovery through the waste energy storage unit 05, thereby increasing the coefficient of performance of the intermittent system.

Figure 2:
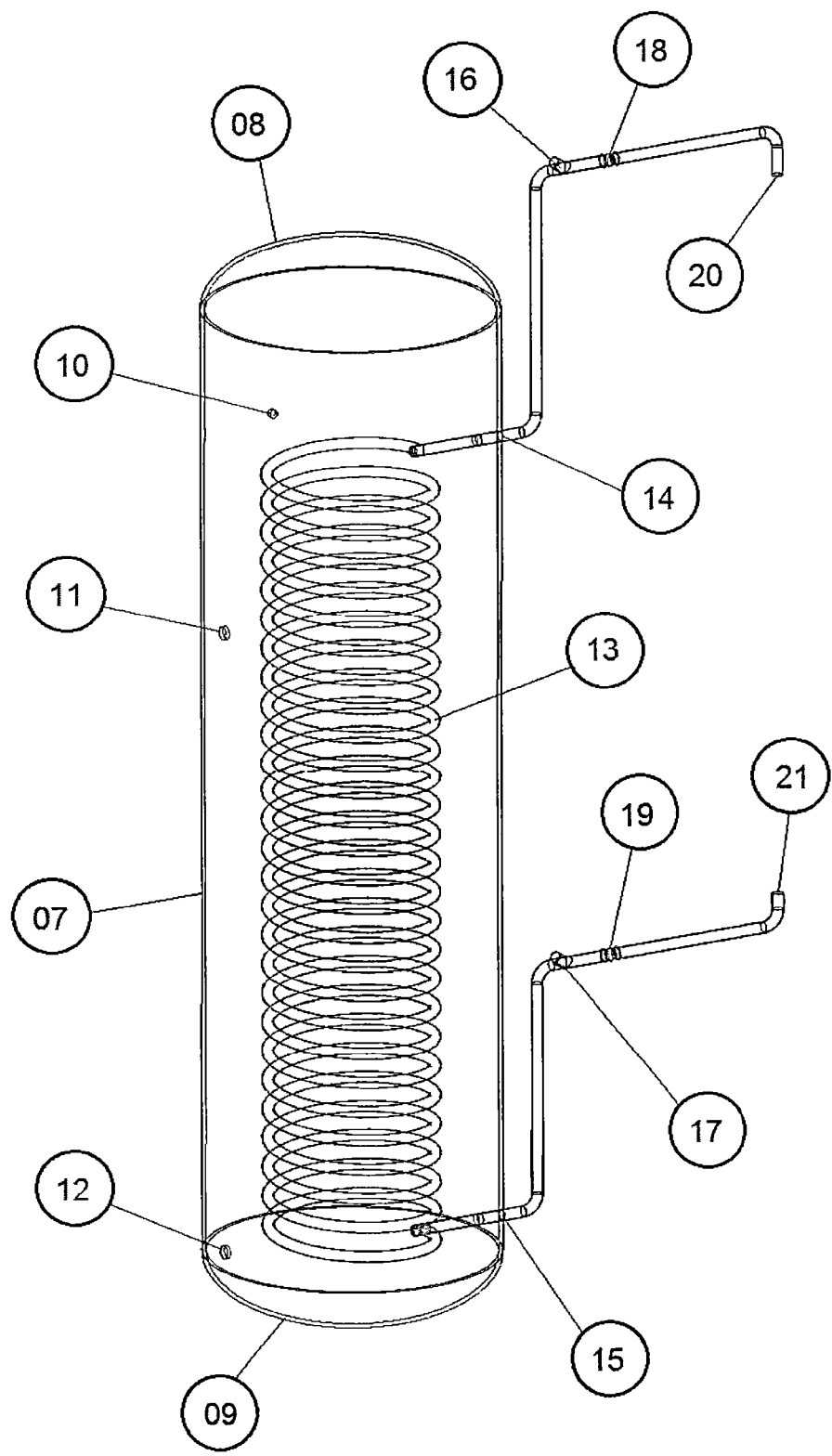
FIG. 2 is a view of a generator/absorber unit.

The structural design for the generator/absorber unit 01 is shown in detail in FIG. 2. The generator/absorber unit 01 consists of a cylindrical shell 07 welded with an upper shell header 08 and a lower shell header 09. A helical coil heat exchanger 13 is located concentric to the cylindrical shell 07 inside the generator/absorber unit 01. This helical coil heat exchanger 13 is connected to an upper header tube 14 and a lower header tube 15, each of which extends out of the generator/absorber unit 01. The upper header tube 14 is connected to both the solar collector field 03 and the waste energy storage unit 05. The connection of upper header tube 14 to the solar collector field 03 is through a tee joint connection 16. The connection of upper header tube 14 to the waste energy storage unit 05 is through ball valve 18 to the location 20 at the top of the waste energy storage unit 05. Similarly, the lower header tube 15 is connected to both the solar collector field 03 and the waste energy storage unit 05. The connection of lower header tube 15 to the solar collector field 03 is through the tee joint connection 17. The connection of lower header tube 15 to the waste energy storage unit 05 is through the ball valve 19 to the location 21 at the bottom of the waste energy storage unit 05.

When supplying energy to the generator/absorber unit 01, hot liquid enters the generator/absorber unit 01 through upper header tube 14, is cooled by supplying heat to the generator/absorber unit 01, becomes denser by being cooled and leaves the generator/absorber unit 01 through the lower header tube 15 due to the thermo-siphon effect. However, when rejecting energy from the generator/absorber unit 01, the comparatively cold liquid enters the generator/absorber unit 01 through lower header tube 15, is heated by gaining heat from the generator/absorber unit 01, becomes less dense by being heated and leaves the generator/absorber unit 01 through the upper header tube 14 due to the thermo-siphon effect. The aqua-ammonia vapor generated inside the generator/absorber unit 01 moves to the dephlegmation and condensation unit 04 through vapor outlet position 10. The vapor outlet position 10 is located such that it is near to the top of the cylindrical shell 07, above the helical coil heat exchanger 13, to ensure that only generated aqua-ammonia vapor may go out of generator/absorber unit 01 through this vapor outlet 10.

The generator/absorber unit 01 is connected to the absorber coil 02 through location 11 and location 12. The level of strong aqua-ammonia liquid inside the generator/absorber unit 01 is at a maximum at the start of the generation process and its level is at a minimum at the start of the absorption process. Location 11 for the absorber coil 02 is made such that it always remains below the lowest level of aqua-ammonia liquid inside the generator/absorber unit 01. Similarly, location 10 for the dephlegmation and condensation unit 04 is made such that it always remains above the highest level of aqua-ammonia liquid inside the generator/absorber unit 01. Generator/absorber unit 01 may be constructed of a material such as stainless steel that can withstand pressure and that is compatible with the particular refrigerant-absorbent combination used in the system. The generator/absorber unit 02 is covered with insulation so that it may not loose heat during the pressurization and generation processes.

Figure 3:
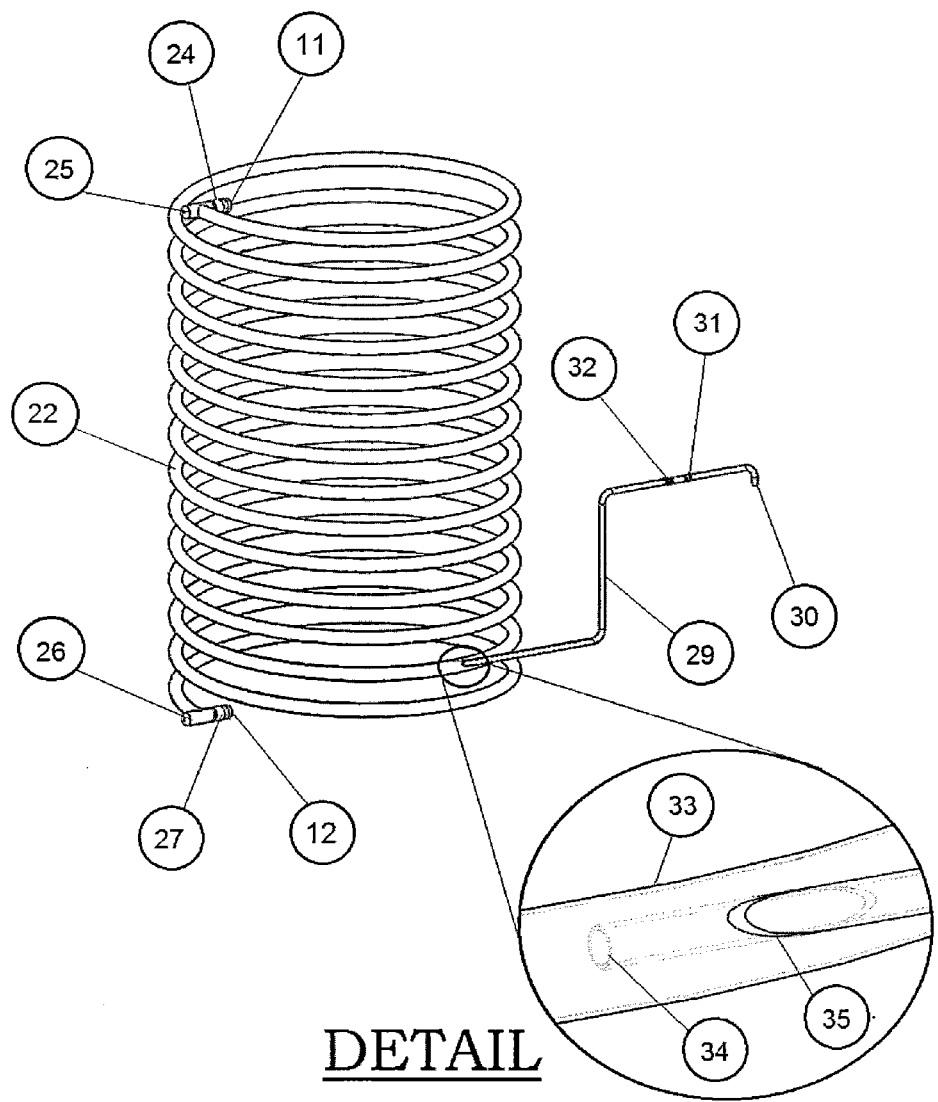
FIG. 3 is a view of an absorber coil, including a detailed view of an arrangement for an inlet flow.

The details of the absorber coil 02 are shown in FIG. 3. The absorber coil 02 is connected to the generator/absorber unit 01 at location 11 and location 12 such that it is concentric to the cylindrical shell 07 and located circumferentially outside shell 07 of the generator/absorber unit 01. In an embodiment, the absorber coil 02 consists of a helical coil heat exchanger 22 and is connected to an upper header tube 25 and a lower header tube 26. The upper header tube 25 is connected through a ball valve 24 to the generator/absorber unit 01 at location 11. Similarly, the lower header tube 26 is connected through a ball valve 27 to the generator/absorber unit 01 at location 12. Absorber coil 02 may be constructed from stainless steel, or another material that can withstand pressure and that is compatible with the particular refrigerant-absorbent combination used in the system. The saturated ammonia vapor from the evaporator unit 06 enters into the tube 29 at outlet 30. This ammonia vapor passes through ball valve 31 and then through throttling valve 32 to enter into absorber coil 02 at location 34. The tube 29 is inserted inside the absorber coil 02 through a wall 33 of absorber coil 02 at location 35 to allow ammonia vapor to be absorbed within the aqua-ammonia liquid inside the absorber coil 02.

The ammonia vapor after entering into the absorber coil 02 will be readily absorbed in the aqua-ammonia solution inside the absorber coil 02. This absorption will cause a significant increase in the temperature of the aqua-ammonia solution inside the absorber coil 02. Since the absorber coil 02 is kept un-insulated, the helical coil heat exchanger 22 will reject heat to the ambient air. The orientation of tube 29 is kept such that any un-absorbed ammonia vapor will tend to move up the coil 22 causing the aqua-ammonia solution to move along with it, producing a bubble pump inside helical coil 22.

Hence, the weak aqua-ammonia solution will enter the absorber coil 02 through location 12, will be mixed with ammonia vapor at location 34, will be heated, causing the un-absorbed ammonia vapor to tend to move up the helical coil 22, forming a bubble pump inside the absorber coil 02, and finally, will enter back into the generator/absorber unit 01 at location 11. The aqua-ammonia vapor-liquid mixture while moving up the absorber coil 02, due to the bubble pump, will tend to lose heat of absorption to the ambient by heat rejection from the helical coil heat exchanger 22. Hence during the absorption process, the flow will tend to move in the upward direction inside the absorber coil 02 due to the bubble pump. However, during the depressurization process, reverse flow will take place; the heated aqua-ammonia liquid inside the helical coil heat exchanger 22 will lose heat to the ambient, become cooled, and move down the absorber coil 02 until it enters back into the generator/absorber unit 01 at location 12 due to the thermo-siphon effect. Valve 24 and ball valve 27 will both be kept open during the depressurization and absorption processes because heat is required to be rejected out to the ambient through the thermo-siphon effect. However during the pressurization and generation processes, valve 24 and ball valve 27 will both be kept closed to ensure that no heat is lost from the generator/absorber unit 01 due to the thermo-siphon effect.

Figure 4:
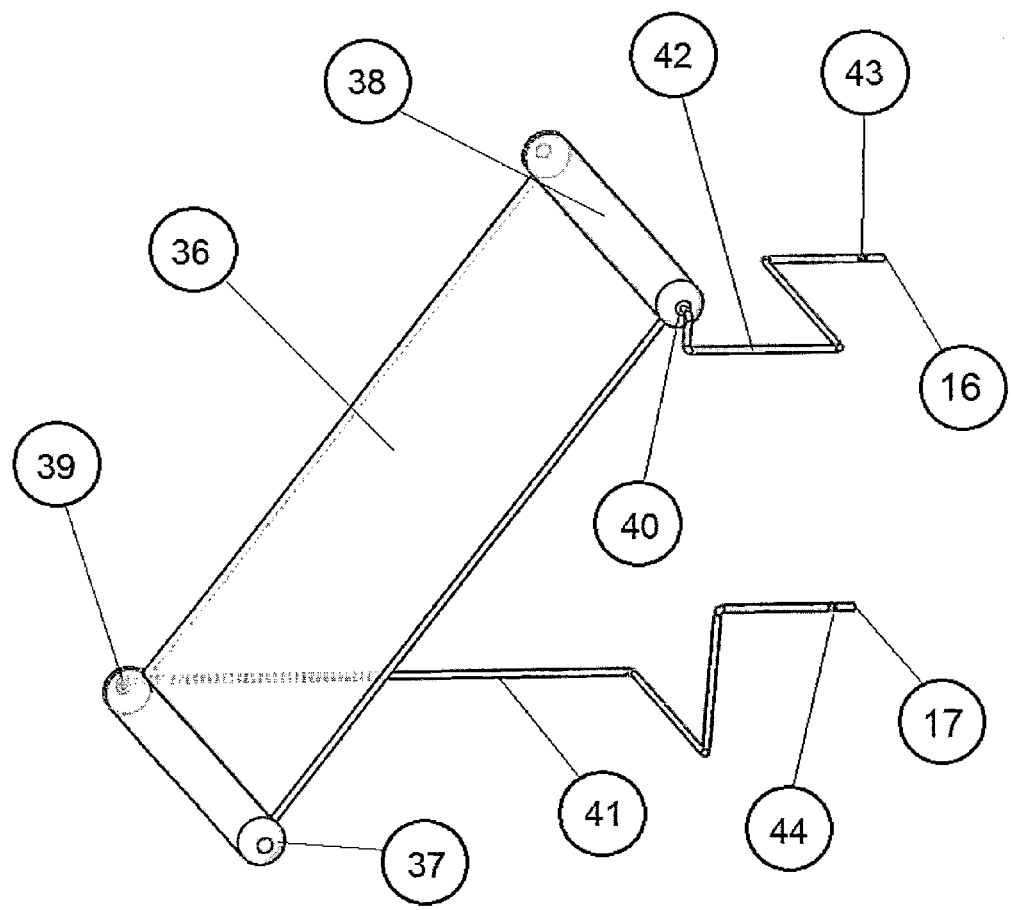
FIG. 4 is a view of a solar collector field, including inlet and outlet flow connections.

The details of the solar collector field 03 are shown in FIG. 4. The solar collector field 03 consists of collector area 36 with a collector upper header 38 and a collector lower header 37. The collector may have solar collector fluid, for example water or another fluid suitable for operation as a medium for heat exchange, such as saline, antifreeze, or oil. The collector may likewise be used to heat a fluid circulating in and out of the solar collector, for example water, or another fluid suitable for operation as a medium for heat exchange, such as saline, antifreeze, or oil. Solar collector 01 converts energy from sunlight into thermal energy that can be used to perform mechanical work on a fluid. Solar collector 01 is a type of thermal collector, which is fundamentally a heat exchanger, and may include any of various configurations of structures adapted for use with various heat sources, such as sunlight, exhaust gas, or geothermal heat, for example. Solar collector 01 may have one or more of various geometries including a flat plate, arc, or compound parabolic curve, for example. Likewise, solar collector 01 may exploit optical or other properties of sunlight, including absorption, reflection, or refraction, for example, to harness useable energy from sunlight.

In an embodiment, comparatively cold water enters pipe 41 at tee joint connection 17, passes through ball valve 44 and enters collector lower header 37 at comparatively cold water inlet 39. The comparatively cold water then gains heat from hot solar collector fluid inside the collector area 36, becomes less dense due to heating, and rises up to be collected in collector upper header 38. The heated water exits the collector upper header 38 at comparatively hot water outlet 40 to enter into pipe 42 where it passes through ball valve 43 to be supplied at tee joint connection 16. The comparatively cold water inlet 39 at the collector lower header 37 is kept opposite to the comparatively hot water outlet 40 at the collector upper header 38 to maintain a uniform pressure differential inside the collector area 36 throughout the solar collector field 03. Pipe 41, pipe 42, collector lower header 37 and collector upper header 38 need to be thoroughly insulated to avoid any loss of heat by heat rejection to the ambient.

Figure 5:
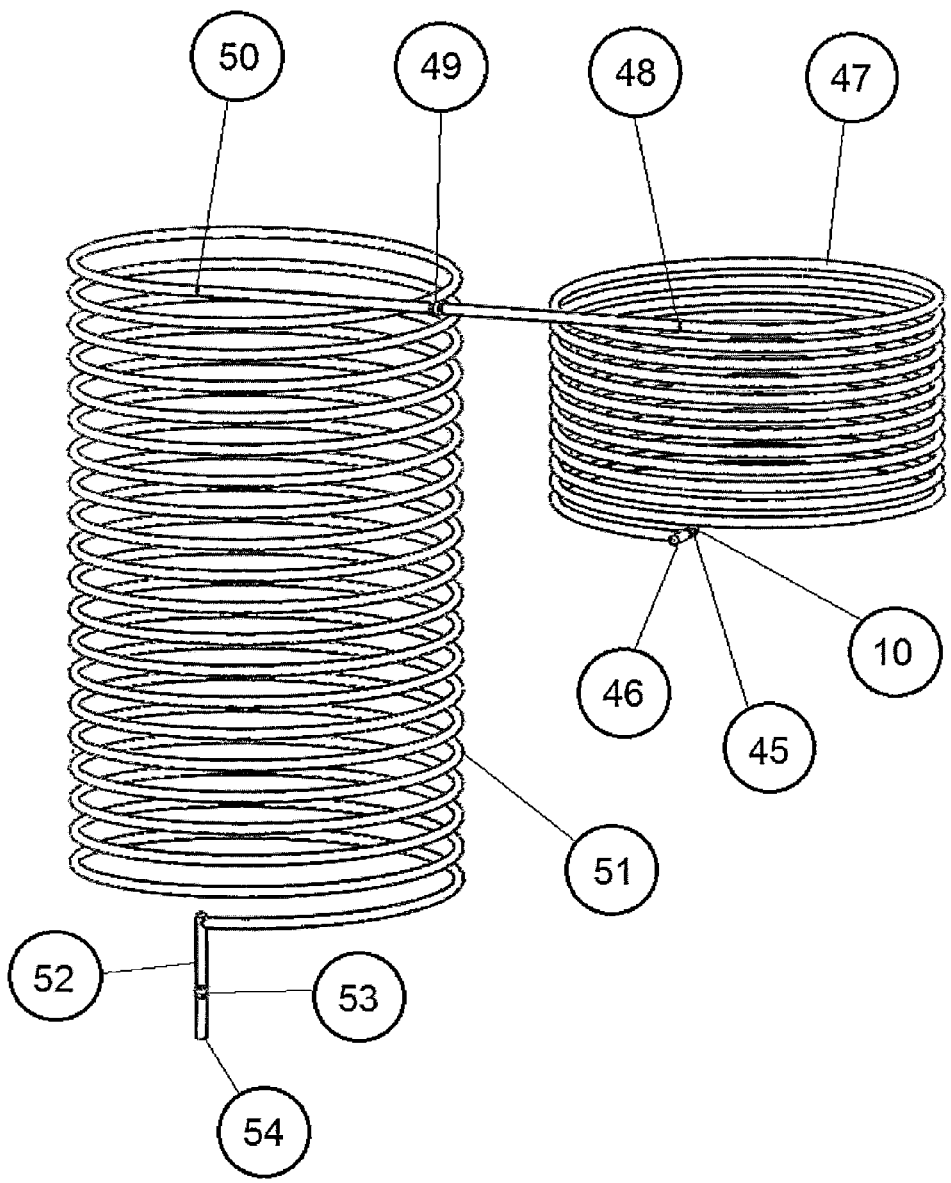
FIG. 5 is a view of a dephlegmation and condensation unit, including inlet and outlet flow connections.

The details of the dephlegmation and condensation unit 04 are shown in FIG. 5. The dephlegmator portion consists of a helical coil heat exchanger 47 made up of stainless steel or another material that can withstand pressure and that is compatible with the particular refrigerant-absorbent combination used in the system. At the bottom, the dephlegmator is connected to a lower header tube 46. The lower header tube 46 is connected to ball valve 45 and is connected to the generator/absorber unit 01 at location 10. The aqua-ammonia vapor leaves the generator/absorber unit 01 at location 10 and enters into the dephlegmator helical coil heat exchanger 47. The helical coil 47 is kept un-insulated to allow heat rejection to take place to the ambient air. The aqua-ammonia vapor while moving up the helical coil 47 tends to lose heat forming rectified ammonia vapor along with dephlegmator condensate inside the helical coil 47. The dephlegmator condensate will move down the helical coil 47 to enter back into the generator/absorber unit 01 whereas the rectified ammonia vapor will tend to move up the helical coil 47 leaving the dephlegmator at location 48. The rectified ammonia vapor then passes through ball valve 49 and enters into the condenser portion at location 50. The condenser consists of a helical coil heat exchanger 51 made of stainless steel or another material that can withstand pressure and that is compatible with the particular refrigerant-absorbent combination used in the system. This helical coil heat exchanger 51 is also kept un-insulated to allow heat rejection to take place to the ambient air. At the bottom, the condenser is connected to lower header tube 52. The lower header tube 52 is connected to ball valve 53 and is connected to evaporator unit 06 at inlet 54. Hence, the rectified ammonia vapor becomes condensed saturated liquid ammonia inside the helical coil heat exchanger 51 by rejecting heat to the ambient. The saturated liquid ammonia then leaves the condenser at inlet 54 to be stored in evaporation unit 06.

Figure 6:
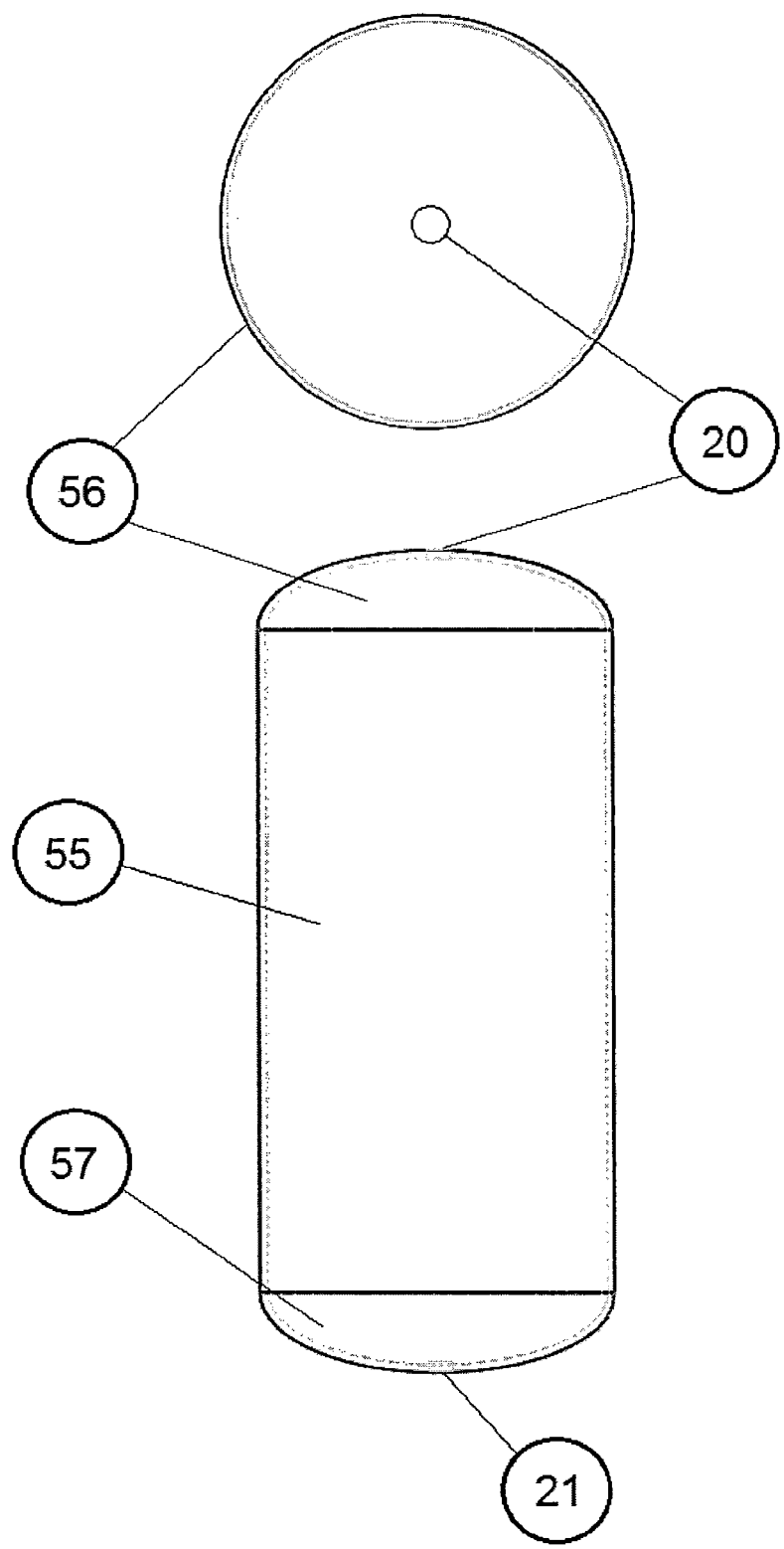
FIG. 6 is a view of a waste energy storage unit.

The details of the waste energy storage unit 05 are shown in FIG. 6. The waste energy storage unit 05 consists of a cylindrical shell 55 welded with an upper shell header 56 and a lower shell header 57. The upper shell header 56 has an opening for a pipe connection at location 20 and similarly, the lower shell header 57 has an opening for a pipe connection at location 21. The shell 55 and shell headers 56 and 57 may be constructed of a material such as metal or plastic suitable to store the heat-transfer fluid. Waste energy storage unit 05 is kept fully insulated to avoid heat rejection to the ambient. To store waste heat in the waste energy storage unit 05, comparatively hot fluid enters the waste energy storage unit 05 through location 20 and comparatively cold fluid leaves the waste energy storage unit 05 through location 21. Similarly while recovering waste heat from the waste energy storage unit 05, comparatively hot fluid leaves the waste energy storage unit 05 through location 20 and comparatively cold fluid enters the waste energy storage unit 05 through location 21. Hence, reverse flow takes place through the waste energy storage unit 05 when recovering waste heat compared to when storing waste heat. The driving force for the flow, in both the cases of heat storage and heat recovery from the waste energy storage unit 05, is the thermo-siphon effect.

Figure 7:
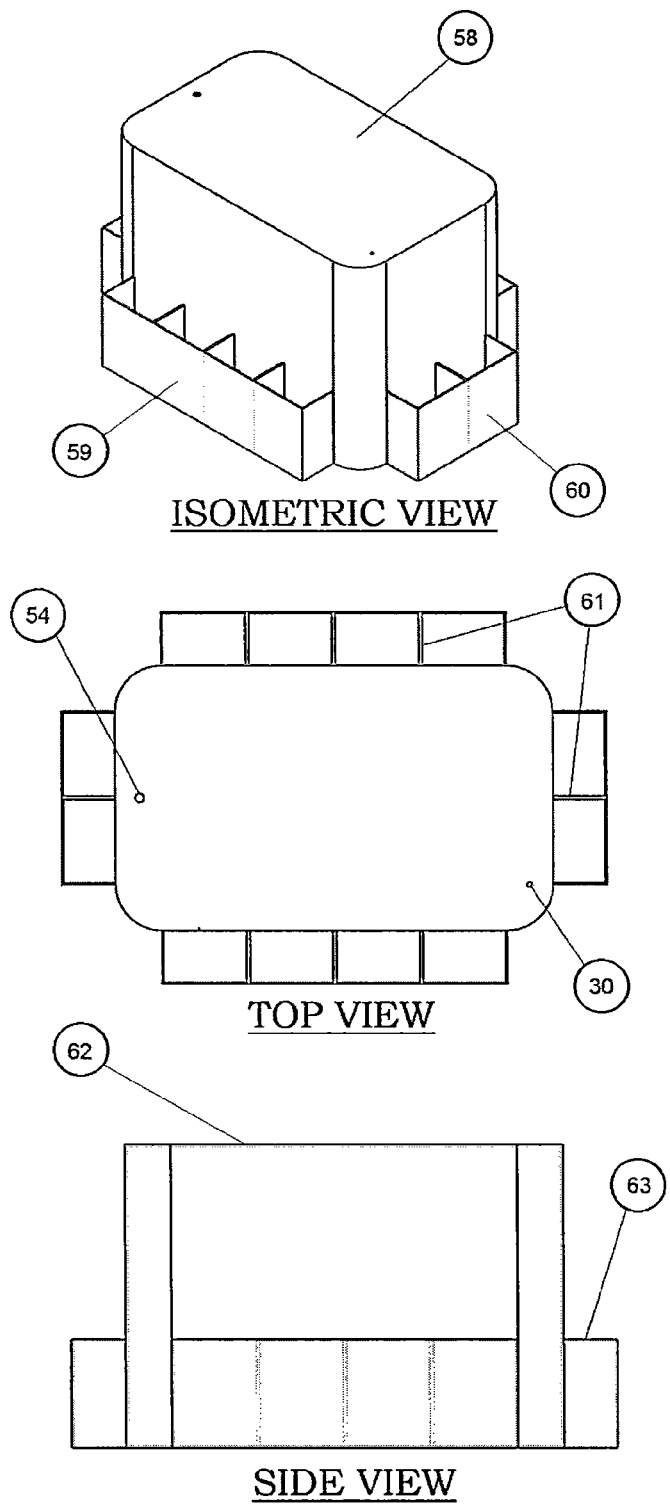
FIG. 7 is a view of evaporation unit 07.

The constructional details of the evaporation unit 06 are shown in FIG. 7. The evaporation unit 06 consists of refrigerant vessel 58 with ice boxes 59 at the front and back sides and ice boxes 60 at the right and left sides. The refrigerant vessel 58 is basically a rectangular cylindrical vessel which is closed on all sides with an inlet 54 for saturated ammonia refrigerant liquid and an outlet 30 for saturated ammonia refrigerant vapor on the top surface of the refrigerant vessel 58. A set of twelve ice boxes, i.e., four ice boxes 59 on each of the front and back sides and two ice boxes 60 on each of the right and left sides surround the refrigerant vessel 58. On each side, the ice boxes 59 and 60 are separated from each other with a thin parting plate 61. The parting plate 61 is provided to generate ice blocks of a specific size that is easy to handle and to utilize wherever required. The height 63 of the ice boxes 59 and 60 is kept one-third of the height 62 of the refrigerant vessel 58.

During the generation process, the refrigerant vessel 58 fills with the saturated ammonia liquid. During the evaporation process, the liquid ammonia inside the refrigerant vessel 58 receives the latent heat of vaporization from the ice boxes 59 at the front and back sides and the ice boxes 60 at the right and left sides, thus producing the required refrigeration effect to produce ice blocks. As ammonia evaporation inside the refrigerant vessel 58 proceeds, the level of refrigerant ammonia inside the vessel 58 will be reduced. However, because of the smaller height 63 of the ice boxes 59 at the front and back sides and the ice boxes 60 at the right and left sides compared to the height 62 of the refrigerant vessel 58, the refrigerant ammonia will keep on producing the refrigeration effect over the whole height 63 of the ice boxes around the refrigeration vessel 58. The evaporated ammonia refrigerant vapor will move upwards inside the vessel 58 and liquid ammonia will move down to come in contact with the ice boxes 59 on the front and back side and the ice boxes 60 on the right and left sides. Hence, due to the smaller height 63 of the ice boxes 59 and 60, the refrigeration effect will continue to take place over the whole height 63 of the ice boxes 59 and 60 even after a portion of the ammonia refrigerant has evaporated.

As ice forms on the outer surface of the refrigerant vessel 58, ice blocks may stick to it. However, as the pressurization process starts to take place, the refrigerant vessel 58 will start heating up and this will provide heat to remove the ice blocks from the outer surface of the refrigerant vessel 58. Thus, early in the daytime, the ice blocks can be removed from the ice boxes 59 and 60 for utilization wherever required. The ice boxes 59 and 60 will be refilled during the daytime with water so that ice can be generated again during the nighttime by the intermittent chiller.

The operation of the intermittent absorption system is given as follows.

1. Partial Pressurization Due to Waste Heat Recovery:

The operation of the system starts with waste energy recovery at the start of the daytime causing partial pressurization of the proposed intermittent system. Ball valve 43 and ball valve 44 are kept closed to isolate the solar collector field 03, whereas ball valve 18 and ball valve 19 are kept open to recover waste heat from the waste energy storage unit 05. Valve 24 and valve 27 are also kept closed to avoid heat loss from the generator/absorber unit 01 during the waste heat recovery process while pressurizing the generator/absorber unit 01. Valve 31 and throttling valve 32 are also kept closed during the pressurization process. Valve 45, valve 49, and valve 53 are kept open during the pressurization process so that the refrigerant vessel 58 and the dephlegmation and condensation unit 04 may be pressurized along with the generator/absorber unit 01.

The heat recovery from waste energy storage unit 05 takes place due to the thermo-siphon effect. This thermo-siphon effect takes place due to the density difference between the hot and cold sides of the circuit. The hot side in this case is the waste energy storage unit 05 and the cold side is the helical coil heat exchanger 13 inside the generator/absorber unit 01. The comparatively hot fluid moves up whereas the comparatively cold fluid moves down, providing the flow for the heat recovery circuit. During this heat recovery process, the temperature difference between the generator/absorber unit 01 and the waste energy storage unit 05 decreases. This heat recovery process stops as the temperature difference between the generator/absorber unit 01 and the waste energy storage unit 05 becomes small enough so that no further flow due to the thermo-siphon effect is possible.

2. Complete Pressurization Due to Solar Energy Input:

Partial pressurization of the generator/absorber unit 01 due to heat recovery through the waste energy storage unit 05 is then followed by complete pressurization of the generator/absorber unit 01 through solar energy during the daytime. Ball valve 18 and ball valve 19 are now closed to isolate the waste energy storage unit 05 whereas ball valve 43 and ball valve 44 are now opened to allow generator/absorber unit 01 to gain solar heat from the solar collector field 03. Valve 24 and valve 27 are again kept closed to avoid heat loss from the generator/absorber unit 01 while pressurizing the generator/absorber unit 01 through solar energy. Valve 31 and throttling valve 32 are also kept closed during this complete pressurization process. Valve 45, valve 49, and valve 53 are kept open during this complete pressurization process so that the refrigerant vessel 58 and the dephlegmation and condensation unit 04 may also be pressurized along with the generator/absorber unit 01.

The heat input from solar collector field 03 takes place due to the thermo-siphon effect. This thermo-siphon effect takes place due to the density difference between the hot and cold sides of the circuit. The hot side in this case is the collector area 36 and the cold side is the helical coil heat exchanger 13 inside the generator/absorber unit 01. The comparatively hot fluid moves up whereas the comparatively cold fluid moves down, providing the flow for the complete pressurization of the generator/absorber unit 01.

3. Generation, Dephlegmation, and Condensation:

Complete pressurization of the generator/absorber unit 01 through the solar collector field 03 is then followed by the generation of aqua-ammonia vapor in the generator/absorber unit 01 through solar energy during the nighttime. Ball valve 18 and ball valve 19 are again kept closed to isolate the waste energy storage unit 05 whereas ball valve 43 and ball valve 44 are kept open to gain solar heat from the solar collector field 03. Valve 24 and valve 27 are again kept closed to avoid heat loss from the generator/absorber unit 01 throughout the generation process. Valve 31 and throttling valve 32 are also kept closed during this generation process. This generation process is simultaneously followed by the dephlegmation and condensation processes. The aqua-ammonia vapor produced in the generator/absorber unit 01 escapes from location 10 into the dephlegmator where it loses heat to the ambient air through helical coil heat exchanger 47 to become rectified ammonia vapor. The dephlegmator condensate produced during this dephlegmation process returns back to the generator/absorber unit 01 whereas the pure rectified ammonia vapor enters into the helical coil heat exchanger 51 to be condensed by rejecting heat to the ambient and to be stored inside the refrigerant vessel 58. Valve 45, valve 49, and valve 53 are kept open during this generation process so that dephlegmation, condensation, and storage of liquid refrigerant may take place at the same time.

The heat input from solar collector field 03 takes place due to the thermo-siphon effect. This thermo-siphon effect takes place due to the density difference between the hot and cold sides of the circuit. The hot side in this case is the collector area 36 and the cold side is the helical coil heat exchanger 13 inside the generator/absorber unit 01. The comparatively hot fluid moves up whereas the comparatively cold fluid moves down providing the flow for the generation process of the generator/absorber unit 01. This generation process stops when the solar collector field 03 has reached the maximum possible temperature and the temperature difference between the generator/absorber unit 01 and the solar collector field 03 becomes small enough so that no further flow due to the thermo-siphon effect is possible. As a result of this generation process, strong aqua-ammonia solution is converted into weak aqua-ammonia solution by generating aqua-ammonia vapor which after dephlegmation becomes rectified pure ammonia vapor and is stored in the refrigerant vessel 58 after the condensation process.

4. Partial Depressurization Due to Waste Heat Storage:

The operation of the proposed design after the generation, dephlegmation, and condensation processes, is followed by waste energy storage at the start of the nighttime, causing partial depressurization of the intermittent absorption system. Ball valve 43 and ball valve 44 are now kept closed to isolate the solar collector field 03, whereas ball valve 18 and ball valve 19 are now kept open to transfer waste heat from the weak aqua-ammonia solution in the generator/absorber unit 01 into the waste energy storage unit 05. Valve 24 and valve 27 are also kept closed to avoid heat loss from the generator/absorber unit 01 during the waste heat storage process while depressurizing the generator/absorber unit 01. Valve 31 and throttling valve 32 are also kept closed during the depressurization process. Valve 45, valve 49, and valve 53 are now kept closed during the depressurization process due to waste energy storage to avoid energy loss to the ambient during this process.

The heat transfer into the waste energy storage unit 05 takes place due to the thermo-siphon effect. This thermo-siphon effect takes place due to the density difference between the hot and cold sides of the circuit. The hot side in this case is the helical coil heat exchanger 13 inside the generator/absorber unit 01 and the cold side is the waste energy storage unit 05. The comparatively hot fluid moves up whereas the comparatively cold fluid moves down, providing the flow for the waste heat storage circuit. During this waste heat storage process, the temperature difference between the generator/absorber unit 01 and the waste energy storage unit 05 decreases. This heat storage process stops as the temperature difference between the generator/absorber unit 01 and the waste energy storage unit 05 becomes small enough so that no further flow due to the thermo-siphon effect is possible.

5. Complete Depressurization Due to Heat Rejection to Ambient:

Partial depressurization of the generator/absorber unit 01 due to waste heat transfer into the waste energy storage unit 05 is then followed by complete depressurization of the generator/absorber unit 01 through heat rejection to the ambient during the nighttime. Ball valve 18 and ball valve 19 are now closed to isolate the waste energy storage unit 05 and ball valve 43 and ball valve 44 are also kept closed to isolate the solar collector field 03 as well. Valve 24 and valve 27 are now opened to allow heat loss from the generator/absorber unit 01 while depressurizing the generator/absorber unit 01. Valve 31 and throttling valve 32 are also kept closed during this complete depressurization process. Valve 45, valve 49, and valve 53 are kept closed during this complete depressurization process as well.

Heat rejection from the absorber coil 02 takes place due to the thermo-siphon effect. This thermo-siphon effect takes place due to the density difference between the hot and cold sides of the circuit. The hot side in this case is the weak aqua-ammonia solution within the generator/absorber unit 01 and the cold side is the helical coil heat exchanger 22 encircling the generator/absorber unit 01. The comparatively hot fluid moves up whereas the comparatively cold fluid moves down providing the flow for the complete depressurization of the generator/absorber unit 01. This complete depressurization process stops when the absorber coil 02 has reached the minimum possible temperature by rejecting heat to the ambient and the temperature difference between the generator/absorber unit 01 and the absorber coil 02 becomes small enough so that no further flow due to the thermo-siphon effect is possible.

6. Evaporation and Absorption:

Complete depressurization of the generator/absorber unit 01 through heat rejection from the absorber coil 02 is then followed by the evaporation of ammonia liquid in the evaporation unit 06 and absorption of aqua-ammonia vapor in the generator/absorber unit 01 at the nighttime. Ball valve 18 and ball valve 19 are again kept closed to isolate the waste energy storage unit 05 and ball valve 43 and ball valve 44 are also kept closed to isolate the solar collector field 03 as well. Valve 45, valve 49, and valve 53 are kept closed during the absorption process. Valve 24 and valve 27 are again kept open to allow heat rejection throughout the absorption process. Valve 31 and throttling valve 32 are now opened during the absorption process. The opening of valve 31 and the throttling valve 32 will cause sudden flashing inside the refrigerant vessel 58 generating a vapor-liquid mixture of ammonia inside the evaporation unit 06. The sudden drop of pressure inside the evaporation unit 06 will cause a sudden drop of temperature inside the refrigerant vessel 58 as well. As a result, a refrigeration effect on water inside ice boxes 59 and 60 will produce ice. The ammonia refrigerant inside the refrigeration vessel 58 will evaporate by taking the latent heat of vaporization to produce ice blocks inside ice boxes 59 and 60. The evaporated ammonia vapor then moves to the absorber coil 02 through the location 34 where it mixes with weak aqua-ammonia solution, producing strong aqua-ammonia solution.

The absorption process releases heat, causing a rise in temperature of the produced strong aqua-ammonia solution within absorber coil 02. Un-absorbed ammonia vapor moves up absorber coil 02, taking strong aqua-ammonia solution with it by way of a bubble pump inside the absorber coil 02. While moving up absorber coil 02, the strong aqua-ammonia solution loses heat to the ambient through heat rejection by the helical coil heat exchanger 22. As a result, the strong aqua-ammonia solution produced inside absorber coil 02 will move back into the generator/absorber unit 01 due to the bubble pump through location 11. This will cause more weak aqua-ammonia solution to enter into absorber coil 02 from the generator/absorber unit 01 through location 12. As a result, both evaporation and absorption processes take place simultaneously. This absorption process stops when the ammonia stored inside the refrigerant vessel 58 has been evaporated, producing ice blocks, and is absorbed by weak aqua-ammonia solution to produce strong aqua-ammonia solution inside the generator/absorber unit 01.

Including waste energy storage unit 05 increases the coefficient of performance of the system. This increase in coefficient of performance corresponds to a decrease in the required collector area for a particular load requirement. Since a solar collector may be the most expensive component of such a refrigeration system, this will result in a considerable decrease in the capital cost of such a system. The cost of the waste energy storage unit 05, which can be an insulated tank with some piping, can be comparatively low. Also, since the temperature in the waste energy storage unit 05 need not be very high, a moderate level of insulation can be used, thereby reducing cost.

According to an embodiment, arranging the absorber coil 02 concentrically around the generator/absorber unit 01 and the dephlegmation and condensation unit concentrically around the generator/absorber unit 01 and the waste energy storage unit 05 has the advantages of reducing the total volume occupied by the system and of reducing the total pipe length in the system, thereby reducing friction losses within the pipes and reducing costs.

In another embodiment, the solar collector has the form of a flat plate. In another embodiment, solar energy is indirectly supplied to the generator by first heating the fluid inside the collector and then exchanging heat between the collector fluid and the refrigerant in the generator using a heat exchanger insider the generator. In another embodiment, the orientation of the generator is independent of the orientation of the solar collector. In another embodiment, the size of a generator/absorber unit is independent of the size of the solar collector. In another embodiment, no heat accumulator is utilized for solar energy storage. In another embodiment, absorbent-refrigerant solution does not flow through the solar collector. In another embodiment, refrigerant vapor is not produced inside the solar collector.

In an embodiment, the evaporator is located outside the generator of the absorption system. In another embodiment, vapor ammonia absorption takes place outside a cylindrical generator/absorber unit. In another embodiment, a cold box is located around the receiver vessel.

In an embodiment, the absorber is not cooled by liquid refrigerant. In another embodiment, a liquid receiver vessel is located inside the evaporation unit. In another embodiment, a liquid receiver vessel is not covered with a water-wicking material. In another embodiment, a helical coil condenser used for condensation has no fins.

In an embodiment, pressurization takes place through an isochoric heating process. In an embodiment, the condenser and absorber comprise separate and distinct structures. In another embodiment, a thermo-siphon effect is utilized for heat supply, heat rejection, and heat recovery.

In an embodiment, a single generator is used for both low-temperature generation and high-temperature generation. In another embodiment, a single absorber is used for both low-temperature absorption and high-temperature absorption. In another embodiment, the generator and the absorber comprise the same pressure vessel.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

We claim:

1. A method for intermittent absorption refrigeration, comprising:

pressurizing a generator/absorber unit by permitting a first portion of a first fluid having temperature $T_{1H}$ to flow out of a waste energy storage unit and into a first heat exchanger comprised in the generator/absorber unit while permitting a second portion of the first fluid having temperature $T_{1C}$ to flow out of the first heat exchanger and into the waste energy storage unit, wherein $T_{1H} > T_{1C}$, such that the first and second portions of the first fluid flow due to a first difference in densities between them;

pressurizing the generator/absorber unit by permitting a first portion of a second fluid having temperature $T_{2H}$ to flow out of a second heat exchanger and into the first heat exchanger while permitting a second portion of the second fluid having temperature $T_{2C}$ to flow out of the first heat exchanger and into the second heat exchanger, wherein $T_{2H} > T_{2C}$, such that the first and second portions of the second fluid flow due to a second difference in densities between them;

generating a first refrigerant vapor from a strong absorbent-refrigerant solution in the generator/absorber unit by permitting a third portion of the second fluid having temperature $T_{3H}$ to flow out of the second heat exchanger and into the first heat exchanger while permitting a fourth portion of the second fluid having temperature $T_{3C}$ to flow out of the first heat exchanger and into the second heat exchanger, wherein $T_{3H} > T_{3C}$, such that the third and fourth portions of the second fluid flow due to a third difference in densities between them;

condensing the first refrigerant vapor into a liquid refrigerant in a condenser and permitting the liquid refrigerant to flow out of the condenser and into a refrigerant vessel;

depressurizing the generator/absorber unit by permitting a third portion of the first fluid having temperature $T_{4H}$ to flow out of the first heat exchanger and into the waste energy storage unit while permitting a fourth portion of the first fluid having temperature $T_{4C}$ to flow out of the waste energy storage unit and into the first heat exchanger, wherein $T_{4H} > T_{4C}$, such that the third and fourth portions of the first fluid flow due to a difference in densities between them;

storing a fifth portion of the first fluid in the waste energy storage unit, wherein thermal insulation reduces heat transfer out of the fifth portion of the first fluid;

depressurizing the generator/absorber unit by permitting a first portion of a weak absorbent-refrigerant solution having temperature $T_{AH}$ to flow out of the generator/absorber unit and into a third heat exchanger while permitting a second portion of the weak absorbent-refrigerant solution having temperature $T_{AC}$ to flow out of the third heat exchanger and into the generator/absorber unit, wherein $T_{AH} > T_{AC}$, such that the first and second portions of the absorbent flow due to a difference in densities between them;

cooling the evaporation unit by permitting the liquid refrigerant in the refrigerant vessel to evaporate into a second refrigerant vapor; and permitting the second refrigerant vapor to flow into the generator/absorber unit.

2. The method of claim 1, wherein the first fluid and the second fluid are both comprised of the same heat transfer fluid.

3. The method of claim 1, wherein the refrigerant is ammonia and the absorbent is water.

4. The method of claim 1, further comprising separating a portion of the absorbent from the first refrigerant vapor in a dephlegmator such that the absorbent returns to the generator/absorber unit and the first refrigerant vapor is supplied in purified form to the condenser.

5. The method of claim 1, further comprising permitting the second refrigerant vapor to flow into the generator/absorber unit by way of an inlet in the third heat exchanger such that as a vapor bubble moves in a vertical direction up the third heat exchanger, the vapor bubble pushes absorbent up the third heat exchanger, thereby forming a bubble pump.

6. The method of claim 1, wherein the depressurizing occurs during nighttime.

7. The method of claim 1, wherein the pressurizing occurs during daytime.

8. An intermittent absorption refrigeration system comprising:
 a generator/absorber unit having, with respect to a vertical direction, disposed in an upper portion thereof, an upper header port, a vapor port, and an upper circulation port, and disposed in a lower portion thereof, a lower header port and a lower circulation port;
 a first heat exchanger disposed within a volume enclosed by the generator/absorber unit, the first heat exchanger having, with respect to the vertical direction, an upper opening and a lower opening;
 a waste energy storage unit having, with respect to the vertical direction, an upper port and a lower port;
 an upper header pipe providing a fluid passageway between the upper opening of the first heat exchanger and the upper port of the waste energy storage unit, the upper header pipe passing through the upper header port of the generator/absorber unit;
 a lower header pipe providing a fluid passageway between the lower opening of the first heat exchanger and the lower port of the waste energy storage unit, the lower header pipe passing through the lower header port of the generator/absorber unit;
 a second heat exchanger having, with respect to the vertical direction, an upper opening, and a lower opening;
 an upper collector pipe providing a fluid passageway between the upper opening of the second heat exchanger and the upper opening of the first heat exchanger;
 a lower collector pipe providing a fluid passage between the lower opening of the second heat exchanger and the lower opening of the first heat exchanger;
 a condenser having, with respect to the vertical direction, an upper opening and a lower opening;
 a condenser inlet pipe providing a fluid passageway between the vapor port of the generator/absorber unit and the upper opening of the condenser;
 a refrigerant vessel having, with respect to the vertical direction, disposed in an upper portion thereof, an inlet and an outlet;
 an evaporator inlet pipe providing a fluid passageway between the lower opening of the condenser and the inlet of the refrigerant vessel;
 an evaporator outlet pipe providing a fluid passageway between the outlet of the refrigerant vessel and the volume enclosed by the generator/absorber unit;
 a third heat exchanger having, with respect to the vertical direction, a lower opening and an upper opening;
 an upper circulation pipe providing a fluid passageway between the upper circulation port and the upper opening of the third heat exchanger;
 a lower circulation pipe providing a fluid passageway between the lower circulation port and the lower opening of the third heat exchanger; and
 a refrigerated space disposed to transfer thermal energy into the refrigerant vessel.

9. The refrigeration system of claim 8, further comprising a dephlegmator disposed between the generator/absorber unit and the condenser, the dephlegmator having, with respect to the vertical direction, a lower opening and an upper opening, the lower opening of the dephlegmator being connected by a fluid passageway to the vapor port of the generator/absorber unit and the upper opening of the dephlegmator being connected to the condenser inlet pipe.

10. The refrigeration system of claim 8, wherein the third heat exchanger has an inlet disposed in a lower portion thereof, the evaporator outlet pipe providing a fluid passageway between the outlet of the refrigerant vessel and the inlet of the third heat exchanger.

11. The refrigeration system of claim 10, wherein the refrigerated space includes an ice box having a surface defined by a wall of the refrigerant vessel, the ice box having a height less than the height of the refrigerant vessel, with respect to a vertical direction.

12. The refrigeration system of claim 8, wherein the first heat exchanger has a helical coil shape.

13. The refrigeration system of claim 8, wherein the second heat exchanger is comprised in a solar collector.

14. The refrigeration system of claim 13, wherein the solar collector includes a collector lower header and a collector upper header.

15. The refrigeration system of claim 14, further comprising insulation disposed around the collector lower header and insulation disposed around the collector upper header.

16. The refrigeration system of claim 8, wherein the third heat exchanger has a helical coil shape.

17. The refrigeration system of claim 8, wherein the generator/absorber unit has a substantially cylindrical shape and the third heat exchanger has a helical coil shape and is disposed concentrically about the generator/absorber unit.

18. The refrigeration system of claim 8, wherein the generator/absorber unit has a substantially cylindrical shape, the waste energy storage unit has a substantially cylindrical shape, the dephlegmator has a helical coil shape and is disposed concentrically about the generator/absorber unit, and the condenser has a helical coil shape and is disposed concentrically about the waste energy storage unit.

19. The refrigeration system of claim 8, further comprising a thermal insulator disposed so as to limit heat transfer between the generator/absorber unit and a surrounding space, a thermal insulator disposed around the upper collector pipe, and a thermal insulator disposed around the lower collector pipe.

20. The refrigeration system of claim 8, further comprising a thermal insulator disposed so as to limit heat transfer between the waste energy storage unit and a surrounding space.

* * * * *